United States Patent

De Klerk

[15] 3,689,784

[45] Sept. 5, 1972

[54] BROADBAND, HIGH FREQUENCY, THIN FILM PIEZOELECTRIC TRANSDUCERS

[72] Inventor: John De Klerk, Pittsburgh, Pa.

[73] Assignee: Westinghouse Electric Corporation, Pittsburgh, Pa.

[22] Filed: Sept. 10, 1970

[21] Appl. No.: 71,094

[52] U.S. Cl.....................310/9.8, 310/9.7, 333/30 R, 333/72

[51] Int. Cl...............................................H01v 7/00

[58] Field of Search..............310/8, 8.3, 8.6, 9.8, 9.7, 310/8.5; 333/72, 30 R

[56] References Cited

UNITED STATES PATENTS

| | | | |
|---|---|---|---|
| 3,587,005 | 6/1971 | Fair | 310/8.1 |
| 3,593,214 | 7/1971 | Cooper | 310/9.7 X |
| 3,150,275 | 9/1964 | Lucy | 310/8.5 X |
| 3,453,711 | 7/1969 | Miller | 310/8 X |
| 3,114,849 | 12/1963 | Poschenrieder | 310/9.7 |
| 3,360,749 | 12/1967 | Sittig | 310/8 X |
| 3,401,360 | 9/1968 | Bois | 310/9.8 X |
| 3,490,055 | 1/1970 | Cox | 333/70 |
| 3,401,275 | 9/1968 | Curran et al. | 310/70 |
| 3,505,542 | 4/1970 | McAvoy | 310/8.5 X |

*Primary Examiner*—J. D. Miller
*Assistant Examiner*—Mark O. Budd
*Attorney*—A. T. Stratton, F. P. Lyle and Gordon H. Telfer

[57] ABSTRACT

Piezoelectric thin film transducers are provided in a form to match the impedance of a transmission line. The transducer structure includes a plurality of serially connected transducer elements on a single substrate provided by a first pattern of electrodes on the substrate, a single layer of piezoelectric material overlying the first electrode pattern and a second electrode pattern overlying the piezoelectric layer with selective connections between electrodes of the first and second patterns, such structure being directly amenable to fabrication by thin film technology. Such an arrangement provides greatly increased bandwidth characteristics and improved conversion efficiency.

5 Claims, 8 Drawing Figures

WITNESSES:
Bernard R. Gregory
James L. Young

INVENTOR
John deKlerk
BY Gordon H. Telfer
ATTORNEY

BROADBAND, HIGH FREQUENCY, THIN FILM PIEZOELECTRIC TRANSDUCERS

BACKGROUND OF THE INVENTION

1. Field of the Invention

This invention relates to electroacoustic apparatus, particularly thin film piezoelectric transducers for microwave frequency applications.

2. Description of the Prior Art

In microwave acoustic device applications, it has been recognized to be important to minimize the insertion loss introduced by any transducer in the system to the lowest possible value. Such insertion losses are due to any or all of the following causes: electrical mismatches, high contact resistances, low electrical impedance, lack of crystal orientation, crystalline imperfections, and lack of perfect stoichiometry of the piezoelectric material. The causes for insertion loss resulting from crystalline and chemical characteristics are inherent in the deposited film transducer and hence difficult to adjust. The causes due to electrical mismatches, high contact resistances, and low electrical impedance can be more easily taken into account and compensated for in the design of a microwave acoustic transducer. The most likely causes of high insertion losses are the related causes of electrical mismatches between the the impedance of the external transmission line to which it is connected and the low electrical impedance that is characteristic of thin film transducers.

It has been in the past found necessary to match the impedance of the transducer to that of the transmission line by some type of impedance transformer, such as a Chebychev transformer or other known type of impedance transformer.

The problem of impedance mismatch is compounded with that of electrical capacity. It is desirable for a transducer to have as low as possible capacity to provide substantial bandwidth in order to reach to very high frequencies. In the case of thin film transducers this has meant reduction in area of the electrodes in an attempt to minimize the capacity. Such minimization of the capacity further decreases the impedance either in terms of resistance or radiation resistance of the structure. Characteristically it has been the case that for transducers to operate in microwave frequencies near 1 gigahertz, the impedance of a cadmium sulfide transducer is approximately 0.01 ohm. Transmission line impedances are characteristically about 50 ohms or more. Thus, the magnitude of the electrical mismatch has been great and not easily corrected by impedance transformers which at such frequencies and for such large mismatches are bulky and expensive devices.

SUMMARY OF THE INVENTION

By this invention means are provided to increase the transducer impedance to the required value for matching with the transmission line impedance without sacrificing any of the acoustic properties of the transducer and providing a very low capacity so as to achieve high frequency operation.

In accordance with the present invention a mosaic of small transducers that are electrically connected in series are provided. In such a series connection of transducer elements, the impedances (whether in terms of resistance or the expression "radiation resistance" as is often used in explanation of transducer phenomenon) are directly additive so that the impedance of the combined combination between the terminals for external connection can be made equivalent to that of a transmission line. Additionally, since the reciprocal of the total capacity is equal to the sum of the reciprocals of each of the individual capacities, the total capacity is quite small and makes possible very high frequency operation.

Achievement of the above described electrical characteristics of the transducer apparatus is made possible by thin film fabrication techniques including a deposition upon a substrate of a first electrode pattern of a plurality of individual electrodes over which is deposited a single layer of piezoelectric material. A second electrode pattern overlies the piezoelectric layer with selective interconnections between the first and second electrode patterns. The application of state-of-the art thin film fabrication techniques permits formation of such structures in extremely small areas with numerous individual elements.

DESCRIPTION OF THE PREFERRED EMBODIMENTS

Figure 1:
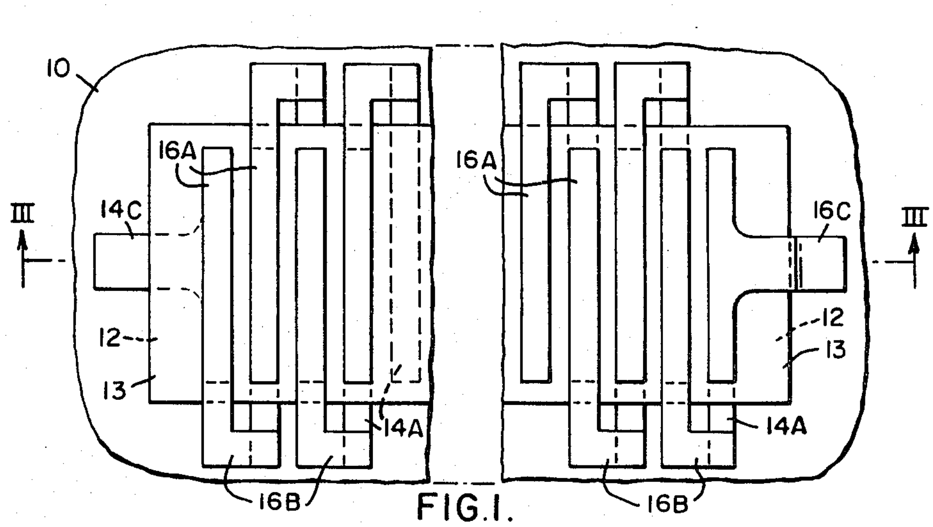
FIG. 1 is a plan view of an embodiment of the present invention.

Referring now to the drawing, there is shown in FIG. 1 a transducer on a substrate 10 that may be an acoustic delay line material, that is, one in which acoustic waves propagate without loss of their characteristic but essentially only a time delay. The structure generally comprises a layer of piezoelectric material 12 sandwiched between first and second patterns of electrodes 14 and 16 that have selective connections therebetween.

Figure 3:
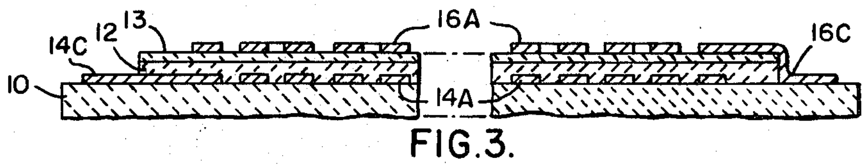
FIG. 3 is a sectional view of the apparatus of FIG. 1 taken along the line III—III.
Figure 4:
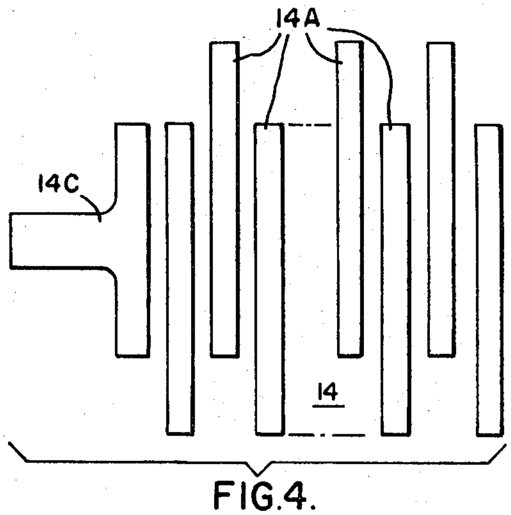
FIGS. 4 and 5 are plan views of electrode elements of the structure of FIG. 1.
Figure 5:
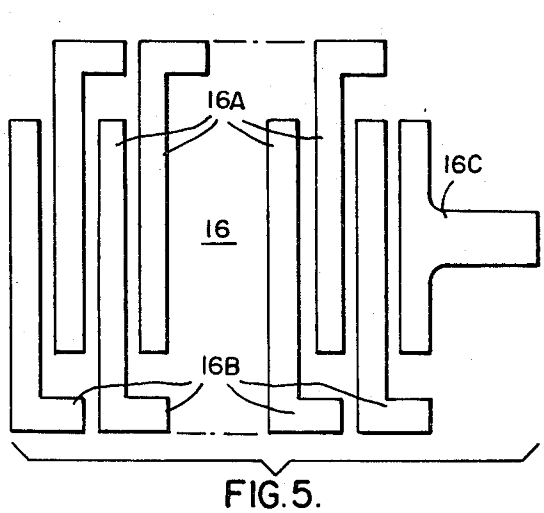

FIG. 4 illustrates the lower electrode pattern 14 that is deposited on the substrate surface, while FIG. 5 illustrates the upper electrode pattern 16, although the patterns may be used interchangeably. Each pattern 14 and 16 comprises a plurality of strip like electrode members 14A and 16A which extend beyond the periphery of the piezoelectric layer 12. Elements 16A of the upper electrode pattern have at one of their ends enlarged portions 16B that overlie the ends of strips 14A for connection therebetween. Otherwise electrode strips 14A and 16A are vertically coincident, as shown in FIG. 3. Additionally, each of the electrode patterns 14 and 16 includes a larger electrode tab 14C and 16C, respectively, that is joined with one of the strip like elements 14A and which likewise extends beyond the periphery of the piezoelectric layer 12. These provide a means for connection of the transducer externally such as to a transmission line which, as was discussed in the introduction has a characteristic impedance with which it is desired to match that of the transducer.

Figure 2:
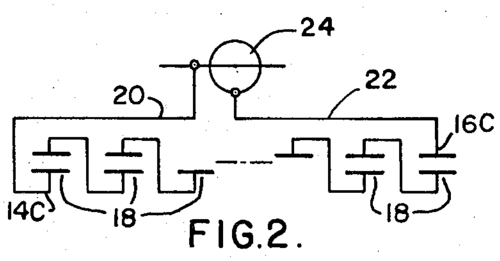
FIG. 2 is a schematic diagram of the equivalent circuit of the apparatus of FIG. 1.

The equivalent circuit of FIG. 2 illustrates how the patterns of electrodes, even though on only a single layer of piezoelectric material, provide a serial connection of a plurality of individual transducer elements 18 between the two electrode tabs 14C and 16C that are connected to conductors 20 and 22, respectively, of a coaxial transmission line 24. In this way resistances can be added to provide an impedance matching that of the external transmission line 24. At the same time capacitances are greatly reduced providing broadband and hence high frequency performance capability.

As FIGS. 1 and 2 show, the bottom electrode of each element 18 is connected to the upper electrode of the next adjacent element to provide the serial connection. It would not be preferred to connect adjacent bottom electrodes and pairs of upper electrodes to give a serial connection because the elements 18 would then be alternatively polarized.

The number of piezoelectric transducer elements 18 that will be necessary to match a particular transmission line depends of course on the impedance of the transmission line as well as the dimensions chosen for the individual transducer elements. In prior thin film transducers it was found necessary to minimize the area of the electrodes as much as possible in order to reduce capacitance and hence the impedance of such transducers was very small, typically of about 0.01 ohm. Here however the capacitances are being reduced by the serial connection of the elements and hence the individual elements need not be so small.

The required configurations for the two electrode patterns and for the piezoelectric layer may be formed in accordance with known thin film fabrication technology. They may, for example, be deposited through apertured masks although they may also be formed by depositing a continuous layer on the surface of substrate 10 and employing subtractive methods to result in the desired pattern.

In accordance with this invention selection of materials to be employed is not critical. Suitable electrodes may be formed by evaporated gold with an initial layer of chromium to provide greater sticking ability to the substrate. The piezoelectric layer 12 may be of cadmium sulfide or other piezoelectric material deposited by various known techniques such as that disclosed in copending application Ser. No. 505,714, filed Oct. 29, 1965, by the present inventor and assigned to the present assignee.

The piezoelectric layer may comprise a single homogeneous layer or it may comprise a single layer of horizontally extending strata that have different characteristics to achieve differing power handling capabilities and bandwidth characteristics by using alternating polarity multilayer thin film piezoelectric transducers in the manner described in U.S. Pat. No. 3,497,727, Feb. 24, 1970, by de Klerk and Kelly. Stagger tuning may be achieved with such structures.

As shown in FIG. 3, the exemplary embodiment also includes a layer 13 of a dielectric material in the sandwich between the electrode patterns which has as its purpose to ensure against any direct shorts occurring inadvertently through the piezoelectric layer resulting from pin holes or the like. Such layer should be thin compared with the piezoelectric layer so as not to influence the acoustic properties.

Transducers have been made in accordance with the illustrated embodiment with a single layer piezoelectric material of cadmium sulfide and electrode structures of gold formed on a substrate of lithium niobate (with an initial layer of chromium for adherence to the substrate). Within an area of 2 by 2 millimeters there were formed electrode patterns of 30 lines each by vapor deposition through apertured masks with the strip like electrodes being approximately twelve microns wide and the spacing therebetween 4 microns. The cadmium sulfide layer was deposited to a thickness of about 2 microns by the method of the above mentioned copending application. A layer of silicon monoxide to a thickness of about 100 Angstroms was deposited on the piezoelectric layer.

The apparatus resulted in a bandwidth of plus or minus fifty percent about a center frequency of 850 megahertz with no external electrical matching to a 50 ohm transmission line.

The embodiment of FIGS. 1 through 5 has to do with compressional or longitudinal waves. However, in accordance with this invention transducer structures for shear waves may be similarly formed. For the case of shear waves it would be necessary that the electrode patterns avoid establishing any electric fields perpendicular to the plane of piezoelectric layer.

Figure 6:
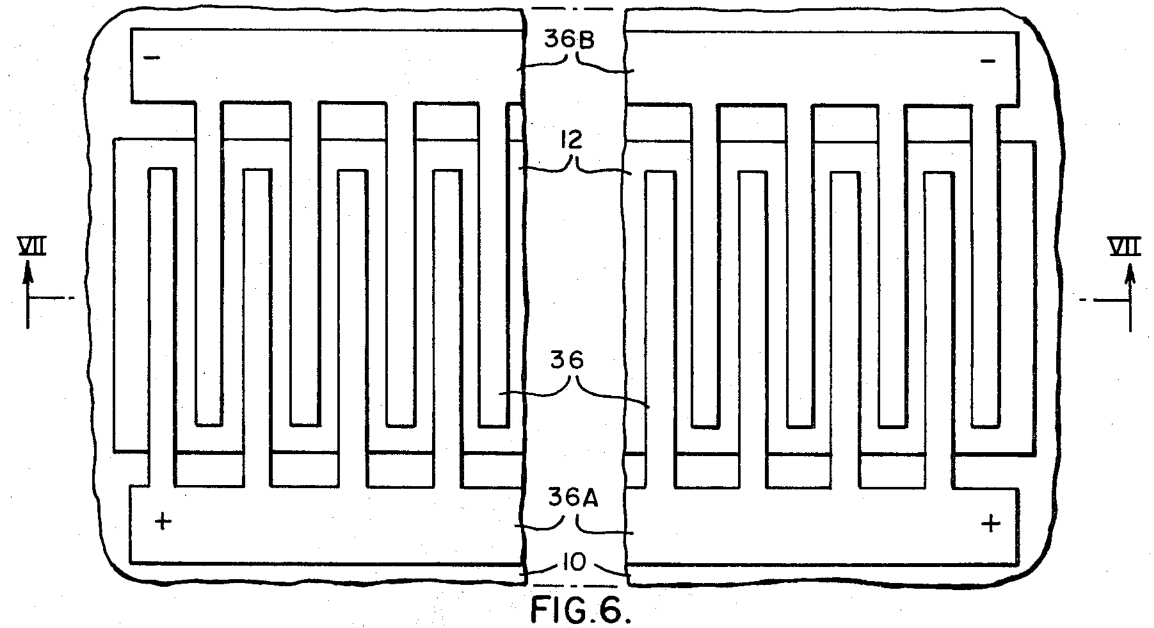
FIG. 6 is a plan view of an alternative embodiment of the invention.
Figure 7:
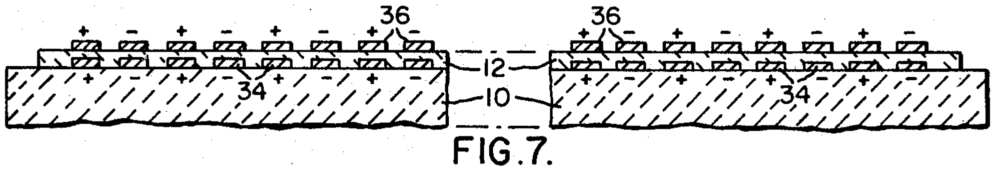
FIG. 7 is a sectional view taken along the line VII—VII of FIG. 6.

FIGS. 6 and 7 illustrate one suitable embodiment for shear waves. Lower and upper electrode patterns 34 and 36 are provided that are identical. The upper pattern 36 is shown in FIG. 6. It includes a pair of comb-like members 36A and 36B with interleaved teeth. The backs of the combs from which the comb teeth extend are positioned on the substrate beyond the periphery of the piezoelectric layer 12 and join with like elements of the lower electrode pattern. The external transmission line may be connected to the large area backs of the combs. As shown in FIG. 7, during any given half cycle, polarity conditions are such that only lateral fields, parallel to the substrate, exist in the piezoelectric layer 12.

Figure 8:
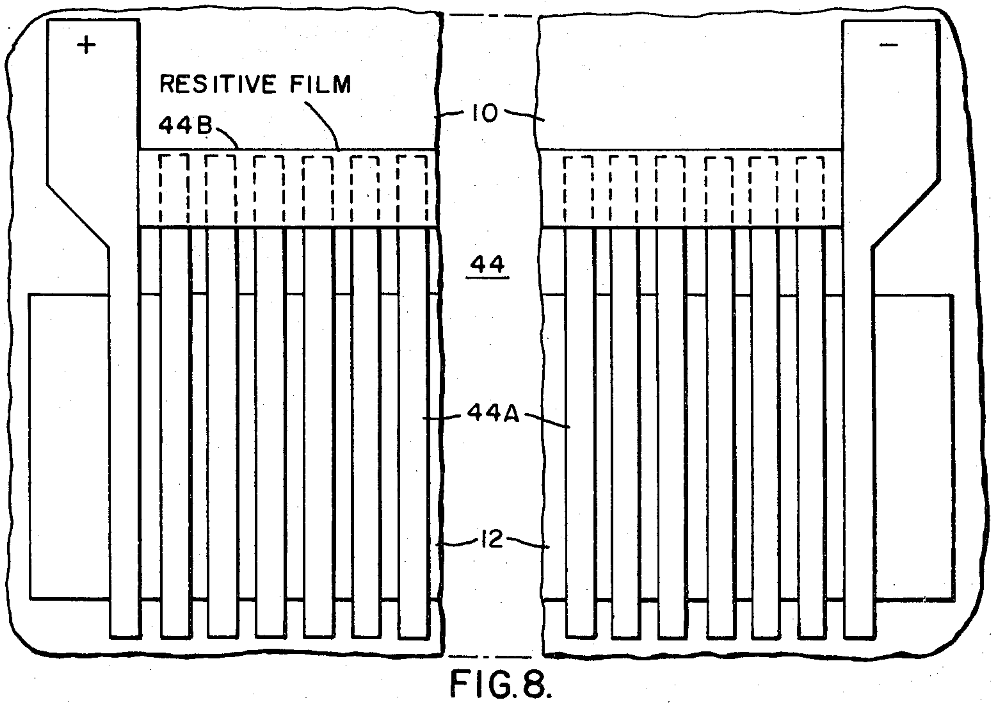
FIG. 8 is a plan view of a further alternative embodiment of the invention.

Another embodiment for shear waves is shown in FIG. 8. A single electrode pattern 44 may be used, either above (as shown) or below the piezoelectric layer 12, or else identical patterns may be used above and below the piezoelectric layer. In the pattern 44 a plurality of strip-like electrodes 44A are joined by a resistive film 44B, such a nickel-chromium film, that provides a certain potential drop between adjacent strips 44A. Thus, a lateral field is provided without polarity reversal.

I claim:

1. Electroacoustic apparatus comprising: an electrical transmission line having a pair of conductors with a characteristic impedance therebetween; piezoelectric transducer means connected said transmission line and including a plurality of serially connected piezoelectric transducer elements on a single substrate having a combined impedance substantially matching that of said transmission line and a combined capacitance that is small compared with that of an individual one of said transducer elements; said plurality of serially connected piezoelectric transducer elements including a first pattern of a plurality of individual electrodes on said substrate, a single layer of piezoelectric material overlying said first electrode pattern, and a second pattern of a plurality of individual electrodes on said layer of piezoelectric material; and said electrodes of said first and second electrode patterns extending beyond the periphery of said layer of piezoelectric material with direct overlying contact therebetween for selective connections between electrodes of said first and second patterns.

2. The subject matter of claim 1 wherein: said first and second electrode patterns each comprise a plurality of generally strip-like parallel electrodes; said first pattern also includes a first major electrode tab joined with one of said strip-like electrodes of said pattern, said first major electrode tab being connected with one of said conductors of said transmission line; said second pattern also includes a second major electrode tab joined with one of said strip-like electrodes of said pattern, said second major electrode tab being connected with the other of said conductors of said transmission line.

3. The subject matter of claim 1 wherein: said substrate is an acoustic delay line material; between said first and second electrode patterns, in addition to said layer of piezoelectric material, is a continuous layer of a non-piezoelectric insulating material, thin compared with the thickness of said layer of piezoelectric material, to ensure against any inadvertent electrical shorts through said layer of piezoelectric material.

4. Electroacoustic apparatus comprising: a substrate; a first electrode pattern on said substrate and designated as a bottom electrode pattern; a single layer of piezoelectric material overlying said bottom electrode pattern; a second electrode pattern on said layer of piezoelectric material on a surface thereof opposite said bottom electrode pattern and designated as a top electrode pattern; each of said electrode patterns comprising first and second spaced interdigitated comb-like electrode elements, said comb-like electrode elements each having a comb back positioned on said substrate beyond the periphery of said piezoelectric layer, said first comb-like electrode element of said top electrode pattern directly overlying said first comb-like electrode element of said bottom electrode pattern and said second comb-like electrode element of said top electrode pattern directly overlying said second comb-like electrode element of said bottom electrode pattern to permit creation of electric fields in said layer only parallel to said substrate.

5. Electroacoustic apparatus comprising: a substrate; a single layer of piezoelectric material supported on said substrate; first and second electrode patterns in contact with said piezoelectric layer, said first electrode pattern being located between said substrate and said piezoelectric layer and said second electrode pattern being located on a surface of said piezoelectric layer opposite said first electrode pattern, said first and second electrode patterns each comprising a plurality of spaced conductive elements with said conductive elements of said second pattern directly overlying said conductive elements of said first pattern; a resistive film serially interconnecting said conductive elements of said first pattern and serially interconnecting said conductive elements of said second pattern, said resistive film having a resistance greater than the resistance of the conductive elements of said first and second patterns; and means for applying a potential difference across the extremities of said resistive film to establish lateral electric fields in said piezoelectric layer.

* * * * *